(12) United States Patent
Kimura et al.

(10) Patent No.: US 12,266,896 B2
(45) Date of Patent: Apr. 1, 2025

(54) CONNECTOR DEVICE

(71) Applicant: Yazaki Corporation, Tokyo (JP)

(72) Inventors: Syuji Kimura, Makinohara (JP); Sadaharu Okuda, Makinohara (JP); Yasuhiro Kominato, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 442 days.

(21) Appl. No.: 17/836,519

(22) Filed: Jun. 9, 2022

(65) Prior Publication Data
US 2022/0416492 A1     Dec. 29, 2022

(30) Foreign Application Priority Data

Jun. 23, 2021   (JP) .................................. 2021-104452

(51) Int. Cl.
*H01R 4/02*         (2006.01)
(52) U.S. Cl.
CPC .................................... *H01R 4/023* (2013.01)
(58) Field of Classification Search
None
See application file for complete search history.

(56) References Cited

U.S. PATENT DOCUMENTS

| | | | | |
|---|---|---|---|---|
| 5,833,476 A | * | 11/1998 | Sakamaki | H01R 35/04 439/15 |
| 7,311,552 B1 | | 12/2007 | Ko | |
| 9,225,096 B2 | * | 12/2015 | Crofoot | H01R 13/405 |
| 10,378,968 B2 | * | 8/2019 | Boguhn | G01K 7/16 |

FOREIGN PATENT DOCUMENTS

| | | |
|---|---|---|
| JP | 7-211405 A | 8/1995 |
| JP | 8-37044 A | 2/1996 |

* cited by examiner

*Primary Examiner* — Ross N Gushi
(74) *Attorney, Agent, or Firm* — Sughrue Mion, PLLC (57) ABSTRACT

A connector device includes a connector housing including a plurality of terminal accommodating chambers, a plurality of terminals accommodated in the plurality of terminal accommodating chambers, and a plurality of electric wires configured to be welded to the respective one of the plurality of terminals. A laser radiation through hole is formed in side walls, each forming the terminal accommodating chambers, the laser radiation through hole being configured to allow the plurality of terminals and the plurality of electric wires to be welded with each other inside the terminal accommodating chambers, and the laser radiation through hole is configured to allow laser light emitted from a laser welding machine disposed outside the connector housing to enter one of the plurality of terminal accommodating chambers.

4 Claims, 5 Drawing Sheets

CONNECTOR DEVICE

CROSS-REFERENCE TO RELATED APPLICATION

The present application claims priority to Japanese Patent Application No. 2021-104452 filed on Jun. 23, 2021, the entire content of which is incorporated herein by reference.

TECHNICAL FIELD

The presently disclosed subject matter relates to a connector device.

BACKGROUND

A general wire harness mounted on a vehicle and the like includes a large number of bundled and integrated electric wires and has a complicated shape. A connector for connecting a predetermined device is usually installed to end portions of the electric wires. When manufacturing the wire harness, sheathes at the end portions of the electric wires each sheathed with an insulator such as a resin are peeled off to expose core wires, and metal terminals are fixed to the end portions of electric wires. The terminals usually use crimping terminals, and distal end portions where the core wires of the electric wires are exposed and positions where the core wires are sheathed are crimped to the terminals by fastening. Then, the metal terminals crimped to the electric wires are inserted into and fixed to predetermined cavities formed in a connector housing that is a connector body.

A related art discloses a technique of performing pressure welding in the connector housing of the connector. Specifically, a terminal fitting includes a U-shaped surrounding portion that surrounds the core wire in the housing. The core wire and the surrounding portion are pressure-welded by a pressure-welding tool. With the surrounding portion of the terminal fitting, heat during welding is less likely to propagate to the connector housing. Therefore, it is possible to perform the welding in the connector housing and join the core wire to the terminal fitting without damaging the connector housing due to burning. The core wire is further prevented from loosening by the tightening function of the surrounding portion. Examples of specific methods for pressure welding include a resistance welding method and an ultrasonic welding method (See, for example, JPH8-37044A).

However, when pressure welding is performed as in the related art, it is necessary to insert a relatively large electrode or the like of a welding machine into a vicinity position facing the terminal fitting and the core wire of the electric wire to be welded, and thus it is necessary to provide a large opening in the connector housing. In addition, it is not easy to arrange a tool such as an electrode in a predetermined position to be welded, making automatic operation less possible.

When a large number of electric wires are accommodated in one connector, it is necessary to arrange a plurality of terminals and electric wires side by side in the width direction and the height direction of the connector. However, the technique used in the related art is not available when assembling such a connector. Alternatively, it is necessary to prepare a plurality of connectors in each of which the terminals and the electric wires are arranged in a line, and to stack and integrate the plurality of connectors in the vertical direction after the terminals and the electric wires are welded. Accordingly, the manufacturing process would be complicated, and the advantage of welding the terminals and the electric wires in the connector housing is impaired.

SUMMARY

Illustrative aspects of the presently disclosed subject matter provide a connector device that can facilitate welding when a terminal is disposed in a connector housing and avoid complicated assembling.

According to an illustrative aspect of the presently disclosed subject matter, a connector device includes a connector housing including a plurality of terminal accommodating chambers, a plurality of terminals accommodated in the plurality of terminal accommodating chambers, and a plurality of electric wires configured to be welded to the respective one of the plurality of terminals. A laser radiation through hole is formed in side walls, each forming the terminal accommodating chambers, the laser radiation through hole being configured to allow the plurality of terminals and the plurality of electric wires to be welded with each other inside the terminal accommodating chambers, and the laser radiation through hole is configured to allow laser light emitted from a laser welding machine disposed outside the connector housing to enter one of the plurality of terminal accommodating chambers.

Other aspects and advantages of the presently disclosed subject matter will be apparent from the following description, the drawings and the claims.

DESCRIPTION OF EMBODIMENTS

A specific embodiment according to the presently disclosed subject matter will be described below with reference to the accompanying drawings.

Figure 1:
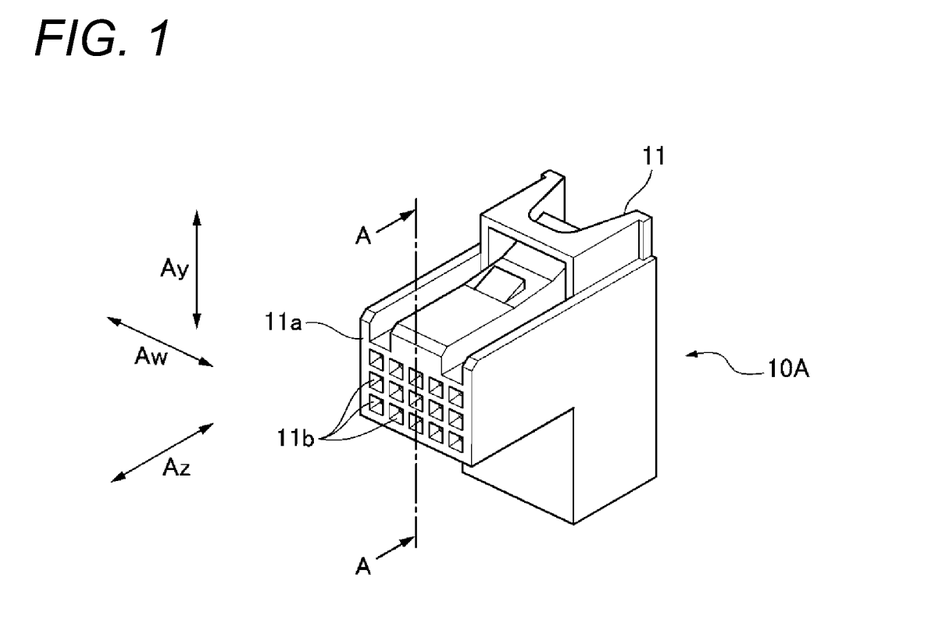
FIG. 1 is a perspective view illustrating an external appearance of a connector housing of a female connector device according to an embodiment of the presently disclosed subject matter.

FIG. 1 is a perspective view illustrating an external appearance of a connector housing 11 of a female connector device (connector 10A) according to the embodiment of the presently disclosed subject matter. The present embodiment only describes an example of the female connector, and a male connector may also be implemented in a similar manner.

As illustrated in FIG. 1, the connector housing 11 forms a connector device that connects a part of a wire harness mounted on a vehicle and the like, that is, end portions of a large number of electric wires forming the wire harness, to a counterpart device.

The connector housing 11 illustrated in FIG. 1 is formed in an L shape. That is, the orientation of the connector housing 11 is bent by 90 degrees at an intermediate portion of the connector housing 11 so that a connector front end portion 11a is oriented in a different direction from a rear end portion on the opposite side. By this shape, it is possible to prevent the electric wires of the wire harness routed in the vehicle from protruding excessively from a device.

Figure 3:
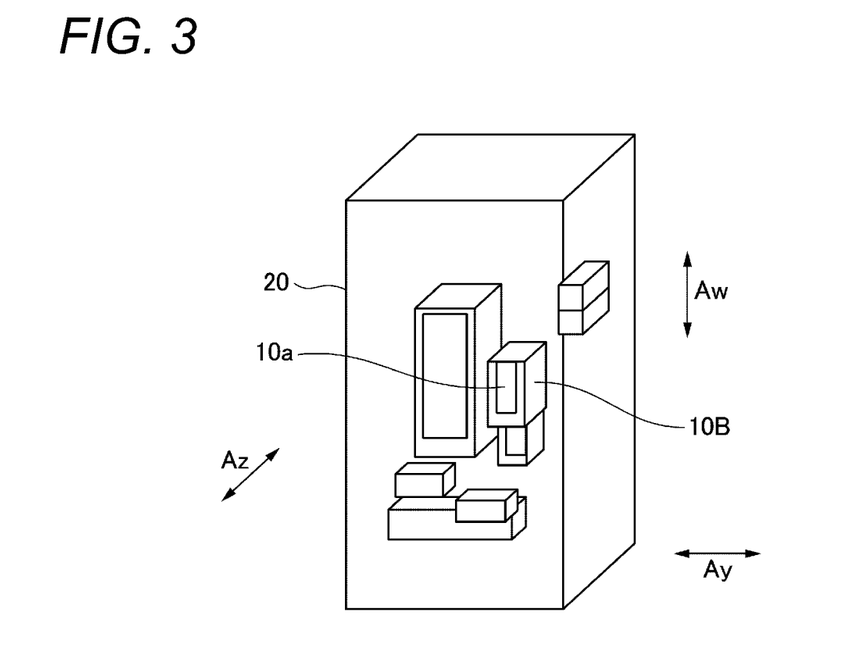
FIG. 3 is a perspective view illustrating an example of a zone ECU of a connection counterpart of the connector device.

The connector front end portion 11a of the connector housing 11 is fitted to, for example, a connector connecting portion 10a of a connector 10B illustrated in FIG. 3, by being positioned to face the connector connecting portion 10a and moved in a connector inserting and removing direction Az.

In the example illustrated in FIG. 1, five terminal openings 11b arranged in a connector width direction Aw are arranged in the connector front end portion 11a in three rows in a connector height direction Ay. That is, the connector housing 11 has 15 terminal openings 11b. Male terminals of the connector connecting portion 10a are inserted into the respective terminal openings 11b.

Figure 2:
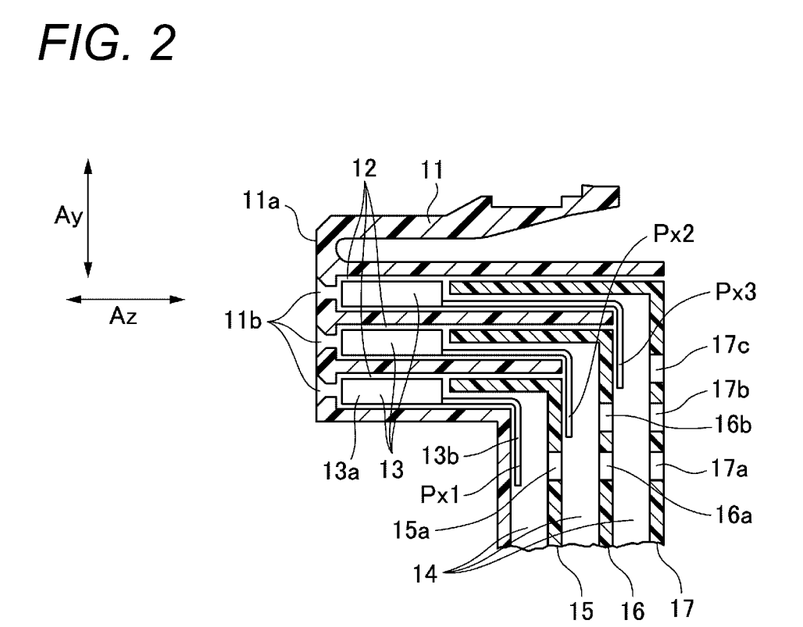
FIG. 2 is a longitudinal sectional view illustrating a section taken along a line A-A in FIG. 1.

FIG. 2 is a longitudinal sectional view illustrating a section taken along a line A-A in FIG. 1. As illustrated in FIG. 2, a plurality of cavities (terminal accommodating chambers) 12 communicating with the respective terminal openings 11b are arranged in parallel inside the connector housing 11.

Each of the cavities 12 has, for example, a rectangular sectional shape and can accommodate a metal terminal 13. The connector housing 11 has fifteen electric wire inserting openings 14 to communicate with the respective fifteen cavities 12. Each of the electric wire inserting openings 14 has a space for accommodating therein an electric wire connection portion 13b of the metal terminal 13 and a sheathed electric wire 30 to be described later.

In the present embodiment, a predetermined number of the metal terminals 13 are placed in the respective fifteen cavities 12 in advance, and a lower cover 15, a middle cover 16, and an upper cover 17 are attached to the connector housing 11 as illustrated in FIG. 2. These elements are assembled to be integrated.

The procedure of the assembly is as follows. First, the metal terminal 13 is installed in the lowermost cavity 12 of the connector housing 11 and then the lower cover 15 is installed. Thereafter, the metal terminal 13 is installed in the middle cavity 12 and the middle cover 16 is installed. Further, the metal terminal 13 is installed in the uppermost cavity 12 and the upper cover 17 is finally installed.

Each of the metal terminals 13 includes a terminal fitting portion 13a and the electric wire connection portion 13b. The terminal fitting portion 13a has a recess for receiving a pin-shaped male terminal, and can fit with the male terminal. The terminal fitting portion 13a further includes therein a protrusion formed by an elastic member such as a spring to enable stable electrical connection.

The electric wire connection portion 13b of the metal terminal 13 is a flat plate-shaped portion coupled with the terminal fitting portion 13a, and is formed in an L shape in which an intermediate portion of the electric wire connection portion 13b is bent by 90 degrees as illustrated in FIG. 2. Therefore, the electric wire connection portion 13b includes a portion extending in the connector inserting and removing direction Az and another portion extending in the connector height direction Ay.

Since the connector housing 11 is formed in an L shape, the plurality of cavities 12 arranged side by side in the connector height direction Ay in the connector housing 11 have shifts from each other. That is, the length of the cavities 12 in the connector inserting and removing direction Az is smallest in the lower cavity 12, larger than the smallest in the middle cavity 12, and largest in the upper cavity 12.

Regarding the length in the connector height direction Ay of the plurality of electric wire inserting openings 14 arranged in the connector inserting and removing direction Az, the length of the electric wire inserting opening 14 on the left side in FIG. 2 is smallest, the length of the electric wire inserting opening 14 in the middle is larger than the smallest, and the length of the electric wire inserting opening 14 on the right side is largest.

The electric wire connection portions 13b of the plurality of metal terminals 13 also have shifts corresponding to relative shifts between the plurality of cavities 12 and the wire inserting openings 14. That is, the length of the electric wire connection portions 13b in the connector inserting and removing direction Az is smallest in the metal terminal 13 on the lower side in the connector height direction Ay, larger in the metal terminal 13 in the middle, and largest in the metal terminal 13 on the upper side. Due to the shifts, positions of rear end portions of the plurality of metal terminals 13 are displaced from each other in the connector height direction Ay in the electric wire inserting openings 14. Therefore, the positions of the rear end portions of the plurality of metal terminals 13 are displaced to not overlap each other.

As illustrated in FIG. 2, welding portions Px1, Px2, and Px3 of the plurality of metal terminals 13 having shifts from each other are displaced from each other in the connector height direction Ay to not overlap each other, which is similar to the positions of the rear end portions of the metal terminals 13. For this reason, the plurality of welding portions Px1, Px2, and Px3 can be welded from the outside of the connector housing 11 in a state where the metal terminals 13 are installed in the respective spaces of the cavities 12 and the electric wire inserting openings 14 of the connector housing 11.

The connector housing 11 further has processing holes in positions facing the welding portions Px1, Px2, and Px3 to receive a laser beam for welding from the outside.

That is, one processing hole (through hole) 15a is formed in the lower cover 15 in the position facing the welding portion Px1. Two processing holes 16a, 16b are formed in the middle cover 16 in the respective positions facing the welding portions Px1, Px2. Three processing holes 17a, 17b, and 17c are formed in the upper cover 17 in the respective positions facing the welding portions Px1, Px2, and Px3.

FIG. 3 is a perspective view illustrating an example of a zone ECU 20 of a connection counterpart of the connector device.

The zone ECU 20 is a control unit that can be used to manage a predetermined zone on the vehicle, and is used to control other ECUs and various in-vehicle devices included in the zone to be managed. The zone ECU 20 is connected to other ECUs and various in-vehicle devices by a wire harness. As an example, the connector 10A illustrated in FIG. 1 is disposed at distal ends of electric wires forming the wire harness.

The zone ECU 20 illustrated in FIG. 3 includes the male connector 10B that can be fitted to the female connector 10A. When the connector 10A of the wire harness faces the position of the connector connecting portion 10a of the connector 10B and is pushed in the connector inserting and removing direction Az, the connector 10A can be fitted to the connector connecting portion 10a. Accordingly, electrical circuits of the terminals of the connector 10A are connected to respective electrical circuits of terminals of the connector 10B.

Here, since the connector housing 11 of the connector 10A is formed in an L shape as illustrated in FIGS. 1 and 2, the electric wires of the wire harness connected to the connector 10A are drawn out from the connector 10A and routed along the connector height direction Ay. Therefore, it is possible to prevent the routing path of the wire harness from largely protruding from the position of the connector 10B in the connector inserting and removing direction Az.

A manufacturing process when manufacturing a connector device forming a part of a wire harness using components such as the connector housing 11 illustrated in FIGS. 1 and 2 will be described below.

FIGS. 4A, 4B, 5A, and 5B are longitudinal sectional views illustrating different states in the manufacturing process of the connector device. In the state illustrated in FIG. 4A, as in the state illustrated in FIG. 2, the metal terminals 13 are installed in advance in the respective cavities 12 in the connector housing 11, and the lower cover 15, the middle cover 16, and the upper cover 17 are attached.

Figure 4A:
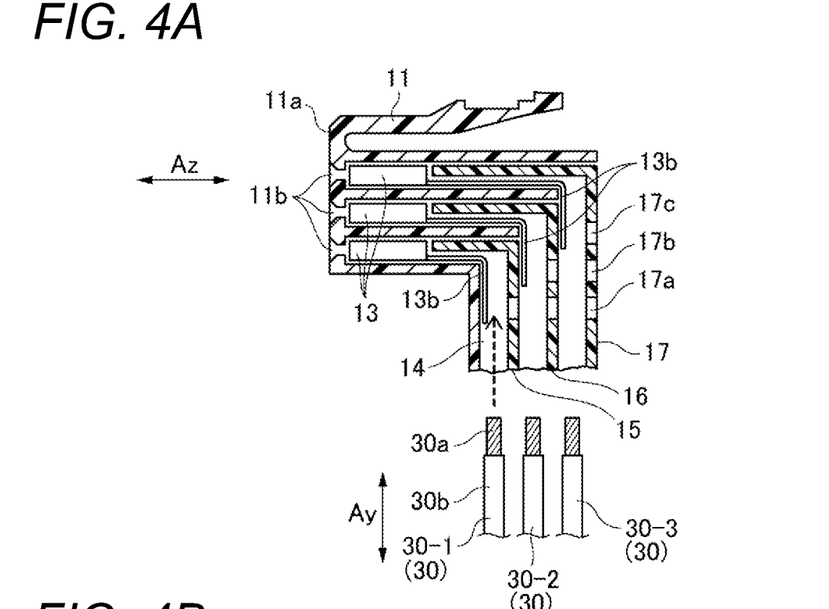
FIGS. 4A and 4B are longitudinal sectional views illustrating different states in the manufacturing process of the connector device.

In the state as illustrated in FIG. 4A, a plurality of the sheathed electric wires 30 forming the wire harness are connected to the respective metal terminals 13 in the connector housing 11. FIG. 4A and the like show only three sheathed electric wires 30-1, 30-2, and 30-3 arranged in the connector inserting and removing direction Az as the sheathed electric wires 30. When connecting the sheathed electric wires 30 to all of the fifteen metal terminals 13 installed in the connector housing 11, the fifteen sheathed electric wires 30 are sequentially arranged in positions facing the electric wire inserting openings 14 and are sequentially connected to the respective metal terminals 13.

As illustrated in FIG. 4A, insulating sheaths 30b are peeled off in advance from distal end portions of the sheathed electric wires 30 to expose core wires 30a.

Figure 4B:
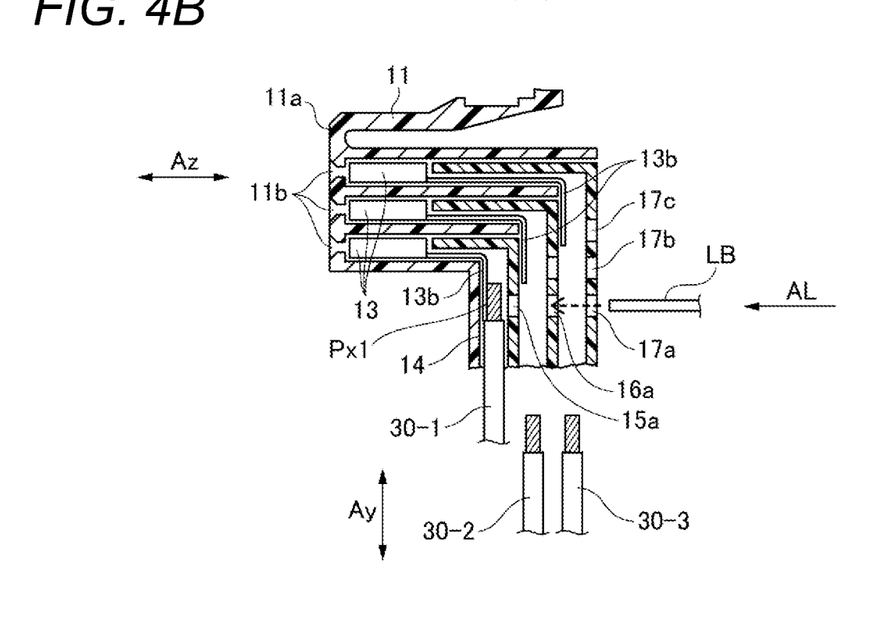

First, as illustrated in FIG. 4A, the plurality of sheathed electric wires 30-1, 30-2, and 30-3 are arranged in vicinity positions facing the electric wire inserting opening 14. Next, as illustrated in FIG. 4B, the sheathed electric wire 30-1 facing the electric wire inserting opening 14 having a smallest distance from a rear end of the electric wire connection portion 13b is first inserted into the electric wire inserting opening 14. Then, the sheathed electric wire 30-1 is positioned such that the entire core wire 30a at the distal end of the sheathed electric wire 30-1 overlaps the electric wire connection portion 13b of the metal terminal 13.

In this state, as illustrated in FIG. 4B, the core wire 30a of the sheathed electric wire 30-1 is located at the welding portion Px1. Since the processing holes 15a, 16a, and 17a are formed in positions facing the welding portion Px1, the space on the right side outside the connector housing 11 communicates with the space in which the core wire 30a of the sheathed electric wire 30-1 is disposed through the processing holes 15a, 16a, and 17a.

Figure 5A:
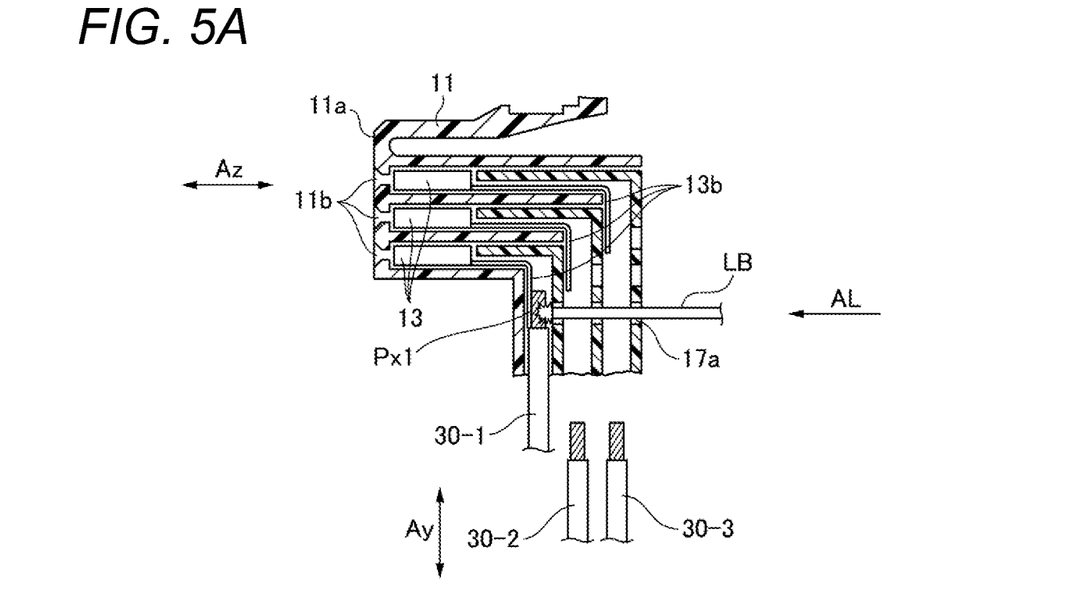
FIGS. 5A and 5B are longitudinal sectional views illustrating different states in the manufacturing process of the connector device.

Therefore, a laser welding machine (not illustrated) disposed outside the connector housing 11 is used to radiate a laser beam LB for welding from the space on the right side toward a laser radiation direction AL. Then, as illustrated in FIG. 5A, the laser beam LB sequentially passes through openings of the processing holes 17a, 16a, and 15a and reaches the position of the core wire 30a of the sheathed electric wire 30-1. The core wire 30a heated and melted by the laser beam LB is welded to the electric wire connection portion 13b of the metal terminal 13 at the welding portion Px1.

When the laser welding machine uses a galvano scanner and the like, the position irradiated with the laser beam LB can be easily adjusted to coincide with each of the positions of the plurality of welding portions Px1, Px2, Px3, and the like.

In the example illustrated in FIG. 4A and the like, the laser beam LB is radiated from the outside. Alternatively, the laser beam LB may be guided to the vicinity of each of the welding portions Px1, Px2, and Px3 by an optical fiber and the like. In this case, the optical fiber is positioned to pass through the openings of the processing holes 17a, 16a, 15a, and the like.

After the welding of the sheathed electric wire 30-1 is completed, the sheathed electric wire 30-2 is subsequently processed. That is, the sheathed electric wire 30-2 arranged in the position facing the middle electric wire inserting opening 14 having an intermediate distance from the electric wire inserting opening 14 to the rear end of the electric wire connection portion 13b is selected. Then, the sheathed electric wire 30-2 is inserted into the electric wire inserting opening 14. The sheathed electric wire 30-2 is positioned such that the entire core wire 30a at the distal end of the sheathed electric wire 30-2 overlaps the electric wire connection portion 13b of the metal terminal 13.

Figure 5B:
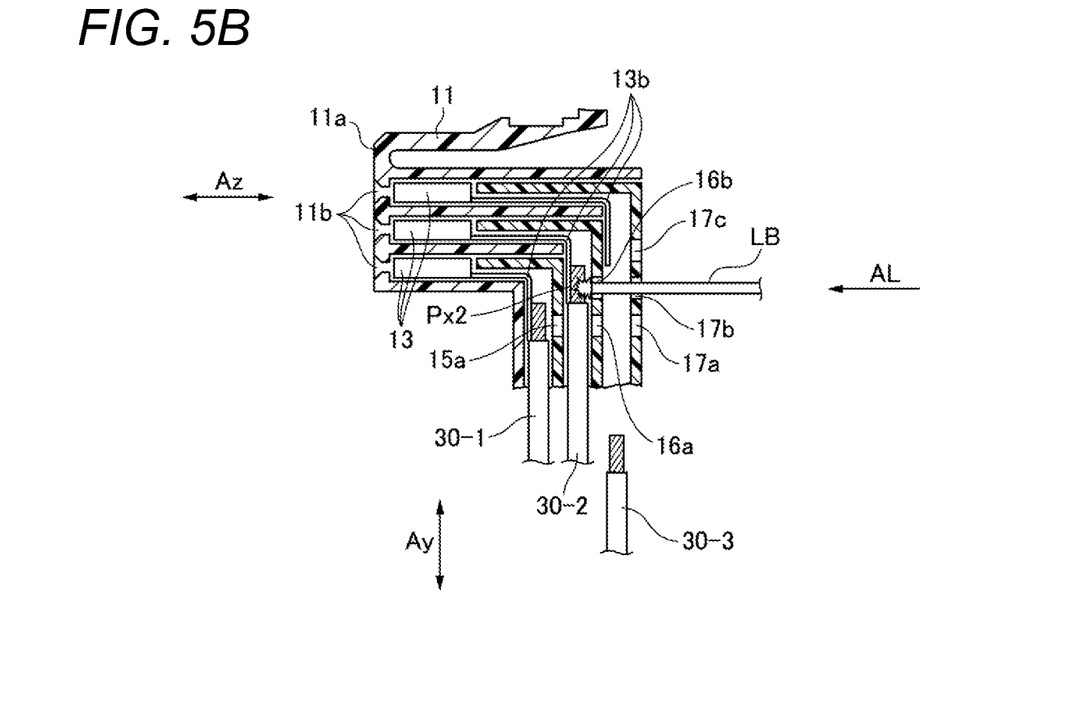

In this state, as illustrated in FIG. 5B, the core wire 30a of the sheathed electric wire 30-2 is located at the welding portion Px2. Since the processing holes 16b, 17b are formed in positions facing the welding portion Px2, the space on the right side outside the connector housing 11 communicates with the space in which the core wire 30a of the sheathed electric wire 30-2 is disposed through the processing holes 16b, 17b.

Therefore, the laser beam LB for welding is aligned with the processing hole 17b, and is radiated from the space on the right side outside the connector housing 11 toward the laser irradiation direction AL. Then, as illustrated in FIG. 5B, the laser beam LB sequentially passes through openings of the processing holes 17b, 16b and reaches the position of the core wire 30a of the sheathed electric wire 30-2. The core wire 30a heated and melted by the laser beam LB is welded to the electric wire connection portion 13b of the metal terminal 13 at the welding portion Px2.

After the processing described above, the same processing can also be performed on the sheathed electric wire 30-3. That is, the sheathed electric wire 30-3 is inserted into the electric wire inserting opening 14, and is positioned such that the entire core wire 30a at the distal end of the sheathed electric wire 30-3 overlaps the electric wire connection portion 13b of the metal terminal 13.

In this state, the core wire 30a of the sheathed electric wire 30-3 is present at the welding portion Px3. Since the processing hole 17c is formed in a position facing the welding portion Px3, the space on the right side outside the connector housing 11 communicates with the space in which the core wire 30a of the sheathed electric wire 30-3 is disposed through the processing hole 17c.

Therefore, the laser beam LB is aligned with the processing hole 17c and is radiated from the space on the right side outside the connector housing 11 toward the laser irradiation direction AL. Then, the laser beam LB passes through the opening of the processing hole 17c and reaches the position of the core wire 30a of the sheathed electric wire 30-3. The core wire 30a heated and melted by the laser beam LB is welded to the electric wire connection portion 13b of the metal terminal 13 at the welding portion Px3.

As described above, by processing the connector in a predetermined order, it is possible to perform laser welding inside the connector housing 11 for each of the plurality of welding portions Px1, Px2, and Px3 having shifts with each other. In particular, even when both the plurality of metal terminals 13 arranged in the connector width direction Aw and the plurality of metal terminals 13 arranged in a plurality of rows in the connector height direction Ay are welded to the sheathed electric wires 30, the welding can be performed after the metal terminals 13 and the sheathed electric wires 30 are arranged in the connector housing 11.

Accordingly, the degree of freedom of the manufacturing process when manufacturing the wire harness is improved. For example, it is easy to separately prepare a factory, equipment, personnel, and the like for manufacturing the connector 10A in the state illustrated in FIGS. 1 and 2 and another factory, equipment, personnel, and the like for performing the processing illustrated in FIGS. 4A, 4B, 5A, and 5B separately, and to change the timing of performing the processing in accordance with the production plan of the vehicle.

When the processing illustrated in FIGS. 4A, 4B, 5A, and 5B is performed in a state where the metal terminals 13 are assembled in the connector housing 11 in advance as illustrated in FIG. 2, the operation can be easily automated and the manufacturing cost can be reduced.

According to an aspect of the embodiments described above, a connector device (connector 10A) includes a connector housing (11) including a plurality of terminal accommodating chambers (for example, cavities 12), a plurality of terminals (for example, metal terminals 13) accommodated in the plurality of terminal accommodating chambers (cavities 12), and a plurality of electric wires (for example, sheathed electric wires 30) configured to be welded to the respective one of the plurality of terminals. A laser radiation through hole (for example, processing holes 15a, 16a, 16b, 17a, 17b, 17c) is formed in side walls (for example, lower cover 15, middle cover 16, upper cover 17), each forming the terminal accommodating chambers, the laser radiation through hole being configured to allow the plurality of terminals and the plurality of electric wires to be welded with each other inside the terminal accommodating chambers, and the laser radiation through hole is configured to allow laser light (for example, laser beam LB) emitted from a laser welding machine disposed outside the connector housing to enter one of the plurality of terminal accommodating chambers.

According to the connector device having the configuration as described above, the terminals and core wires of the electric wires can be welded in the terminal accommodating chambers by the radiation of the laser light. The laser beam used for welding can be narrowed, and thus welding can be performed by the laser welding machine disposed outside the connector housing even when sizes of the laser radiation through holes are small. No special tool is necessarily brought close to portions to be welded during welding, and thus no large opening in the connector housing is necessary. Therefore, welding is easily performed after all components are assembled into the connector housing.

Shapes of the plurality of terminal accommodating chambers may be set such that positions at which portions to be welded (welding portions Px1, Px2, Px3) of the plurality of terminals are located are separated from each other.

With this configuration, even when the plurality of terminals overlap each other in the radiation direction of the laser light, the portions to be welded of the plurality of terminals have shifts from each other without overlapping each other due to the positional shifts. Therefore, even when a plurality of rows of terminals are arranged in the horizontal direction and the vertical direction in the connector, all the terminals can be welded by simply changing radiation positions of the laser light, and the operation process is easily avoided from being complicated.

The laser radiation through hole may be a plurality of the laser radiation through holes. The plurality of laser radiation through holes may be arranged such that positions at which the plurality of laser radiation through holes are located are separated from each other in an insertion direction (connector height direction Ay) in which the electric wires are inserted into the respective terminal accommodating chambers (for example, electric wire inserting openings 14).

With this configuration, the plurality of laser radiation through holes are arranged corresponding to the shifts. Accordingly, even when a plurality of rows of terminals are arranged in the lateral direction and the vertical direction in the connector, the laser light can be radiated from the outside to the portions to be welded of all the terminals through the laser radiation through holes by simply changing the radiation positions of the laser light. Therefore, the operation process can be avoided from being complicated.

The laser radiation through hole may be a plurality of the laser radiation through holes. Positions at which the plurality of laser radiation through holes (15a, 16a, 17a) are located may overlap each other in the laser radiation direction (AL). The laser light may pass through one or the plurality of the laser radiation through holes and reaches the portions to be welded (welding portions Px1, Px2) of the terminals.

With this configuration, when the plurality of terminals overlap each other in the radiation direction of the laser light, the laser light can be radiated to the portion to be joined of the terminal arranged on a deep side of the overlap by a path passing through the plurality of laser radiation through holes. Therefore, even when a plurality of rows of terminals are arranged in the horizontal direction and the vertical direction in the connector, all the terminals can be welded by simply changing the radiation positions of the laser light without changing the configuration of the connector housing, and the operation process is avoided from being complicated.

The connector device may further include another connector housing configured to be fitted to the connector housing (11). Each of the plurality of terminal accommodating chambers (cavities 12, electric wire inserting openings 14) may have a bent shape with respect to a fitting direction in which the connector housing and the another connector housing are fitted to each other and may be configured to accommodate the plurality of terminals each having a bent shape.

With this configuration, each of the terminal accommodating chambers of the connector housing has a bent shape, and thus the electric wires of the wire harness connected to the connector of the counterpart device are easily routed to not pass through a path largely protruding from the connection surface of the device. Further, the shape of the connector housing around the portions to be welded of the terminals are flat, and the operation in the welding process is easy.

What is claimed is:

1. A connector device comprising:
a connector housing including a plurality of terminal accommodating chambers; a plurality of terminals accommodated in the plurality of terminal accommodating chambers; and a plurality of electric wires configured to be welded to the respective one of the plurality of terminals,
wherein a laser radiation through hole is formed in side walls and penetrates in a direction in which the plurality of electric wires are aligned, each forming the terminal accommodating chambers, the laser radiation through hole being configured to allow the plurality of terminals and the plurality of electric wires to be welded with each other inside the terminal accommodating chambers, and wherein the laser radiation through hole is configured to allow laser light emitted from a laser welding machine disposed outside the connector housing to enter one of the plurality of terminal accommodating chambers, and wherein each of the plurality of terminal accommodating chambers has a bent shape with respect to a fitting direction in which the connector housing and the another connector housing are fitted to each other and is configured to accommodate the plurality of terminals each having a bent shape, wherein shapes of the plurality of terminal accommodating chambers are set such that positions at which portions to be welded of the plurality of terminals are located are separated from each other, wherein the laser radiation through hole is a plurality of the laser radiation through holes, and wherein the plurality of laser radiation through holes are arranged such that positions at which the plurality of laser radiation through holes are located are separated from each other in an insertion direction in which the electric wires are inserted into the respective terminal accommodating chambers.

2. The connector device according to claim 1, wherein the positions at which the plurality of laser radiation through holes are located overlap each other in the laser radiation direction, and wherein the laser light passes through one or the plurality of the laser radiation through holes and reaches the portions to be welded of the terminals.

3. A connector device comprising:

a connector housing including a plurality of terminal accommodating chambers; a plurality of terminals accommodated in the plurality of terminal accommodating chambers; a plurality of electric wires configured to be welded to the respective one of the plurality of terminals; and another connector housing configured to be fitted to the connector housing, wherein a laser radiation through hole is formed in side walls and penetrates in a direction in which the plurality of electric wires are aligned, each forming the terminal accommodating chambers, the laser radiation through hole being configured to allow the plurality of terminals and the plurality of electric wires to be welded with each other inside the terminal accommodating chambers, wherein the laser radiation through hole is configured to allow laser light emitted from a laser welding machine disposed outside the connector housing to enter one of the plurality of terminal accommodating chambers, and wherein each of the plurality of terminal accommodating chambers has a bent shape with respect to a fitting direction in which the connector housing and the another connector housing are fitted to each other and is configured to accommodate the plurality of terminals each having a bent shape.

4. A connector device comprising:

a connector housing formed in an L-shape including a plurality of terminal accommodating chambers arranged in parallel along a connector height direction; a plurality of terminals accommodated in the plurality of terminal accommodating chambers; and a plurality of electric wires configured to be welded to the respective one of the plurality of terminals, wherein a lower cover, a middle cover, and an upper cover are attached to the connector housing to be integrated, wherein a plurality of laser radiation through holes is formed in side walls, each forming the terminal accommodating chambers, the plurality of laser radiation through holes being configured to allow the plurality of terminals and the plurality of electric wires to be welded with each other inside the terminal accommodating chambers, and wherein the plurality of laser radiation through holes is configured to allow laser light emitted from a laser welding machine disposed outside the connector housing to enter one of the plurality of terminal accommodating chambers, wherein shapes of the plurality of terminal accommodating chambers are set such that positions at which portions to be welded of the plurality of terminals are located are separated from each other, wherein welding portions of the plurality of terminals are displaced from each other in an insertion direction in which the plurality of electric wires are inserted into the respective terminal accommodating chambers, the insertion direction corresponding to the connector height direction, wherein one laser radiation through hole is formed in the lower cover (15) in the position facing a first welding portion, two laser radiation through holes are formed in the middle cover in the respective positions facing the first welding portion and a second welding portion, and three laser radiation through holes are formed in the upper cover in the respective positions facing the first welding portion, the second portion and a third welding portion, wherein positions at which the laser radiation through holes facing a same welding portion overlap each other in the laser radiation direction, and wherein the laser light passes through one or more of the plurality of laser radiation through holes and reaches the portions to be welded of the terminals.

* * * * *